United States Patent [19]

Nadan et al.

[11] 4,435,687
[45] Mar. 6, 1984

[54] CLOCK SIGNAL RECOVERY CIRCUIT

[75] Inventors: Joseph S. Nadan, Ossining, N.Y.; George C. Kenney, II, Stamford, Conn.; Marino G. Carasso, Son, Netherlands

[73] Assignee: North American Philips Corporation, New York, N.Y.

[21] Appl. No.: 228,527

[22] Filed: Jan. 26, 1981

Related U.S. Application Data

[63] Continuation of Ser. No. 30,259, Apr. 16, 1979, abandoned.

[51] Int. Cl.³ .............................................. H03L 7/06
[52] U.S. Cl. ........................................ 331/23; 331/25; 375/110; 375/120
[58] Field of Search ................. 329/50, 104, 107, 122, 329/124; 375/1, 115, 116, 120, 106, 108, 110; 331/23, 25

[56] References Cited

U.S. PATENT DOCUMENTS

| | | | |
|---|---|---|---|
| 3,491,202 | 1/1970 | Bailey et al. | 375/116 |
| 3,558,824 | 1/1971 | Ogawa et al. | 375/120 |
| 3,654,564 | 4/1972 | Tisi et al. | 329/50 X |
| 4,010,323 | 3/1977 | Peck | 375/84 |

Primary Examiner—Siegfried H. Grimm
Attorney, Agent, or Firm—Thomas A. Briody; William J. Streeter; Edward W. Goodman

[57] ABSTRACT

An absolute differentiator receives a self-clocking digital input signal, and its output is applied to a series of delay elements. The outputs of the differentiator and the delay elements are coupled to an OR-gate. The output of the OR-gate is applied to a phase-locked loop to produce a recovered clock signal. The delay elements can be variable with a delay controlled by an output signal from the phase-locked loop, to thereby track a varying center frequency of the digital input signal.

7 Claims, 7 Drawing Figures

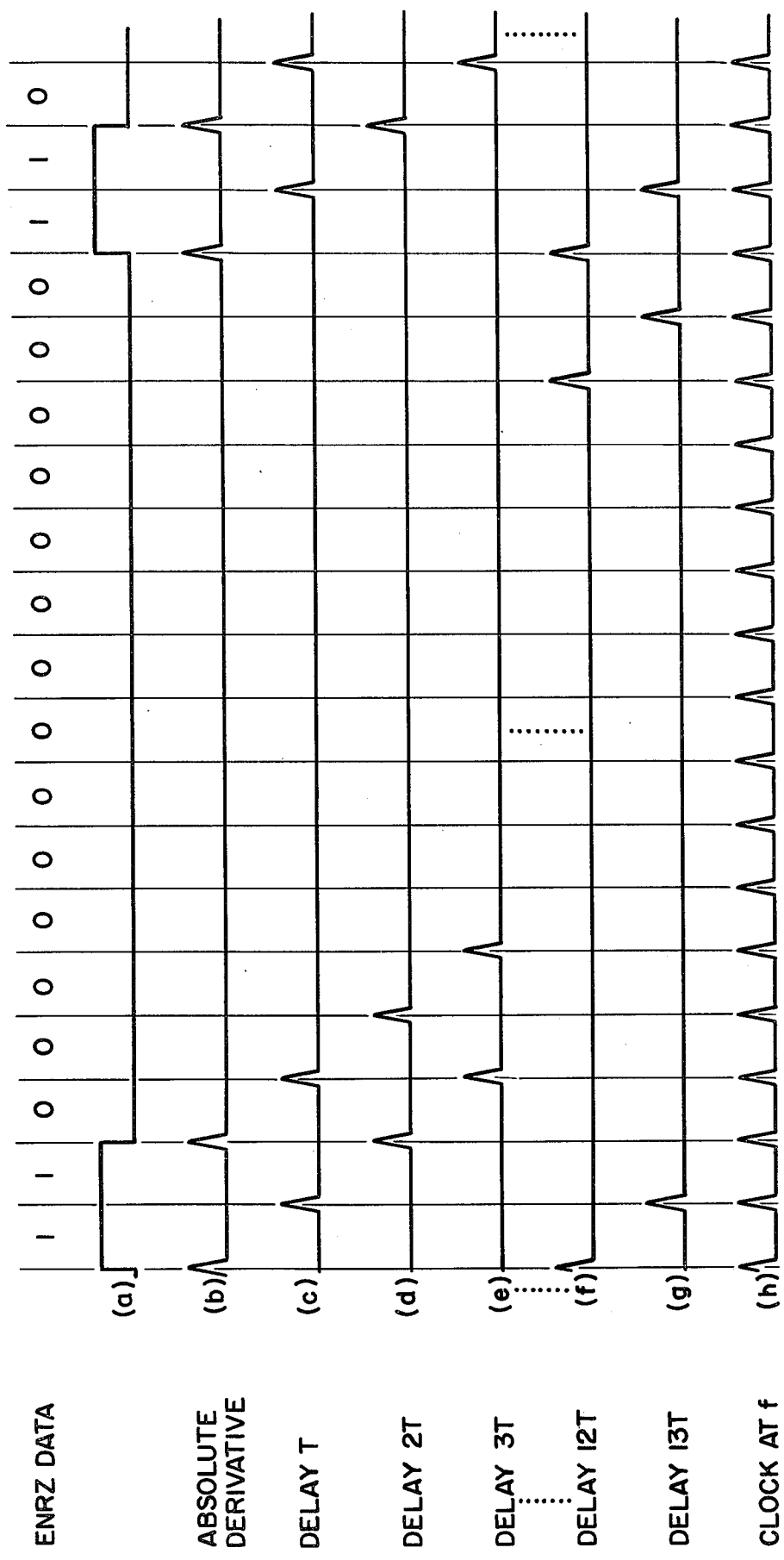

CLOCK SIGNAL RECOVERY CIRCUIT

This application is a continuation of application Ser. No. 030,259, filed Apr. 16, 1979, now abandoned.

BACKGROUND OF THE INVENTION

The present invention relates to demodulation of digital signals, and more particularly to digital signals that are of the self-clocking type.

In digital transmission, a problem can arise where a large number of consecutive data signals having the same polarity are transmitted. In such a case, it may be very difficult to extract the clock frequency from the data signals. Still another problem is that the center frequency of the modulated signal may be varying, thus making demodulation even more difficult.

SUMMARY OF THE INVENTION

It is therefore an object of the present invention to enable recovery of the clock signal from self-clocking data modulation signals.

It is a further object to provide a demodulator that will track a varying center frequency.

In brief, these and other objects are accomplished by having an absolute differentiator receive the data signal and apply its output signal to a series of delay elements. The outputs of the differentiator and the delay elements are coupled to an OR-gate. Thus, if only a single transition occurs within the time equal to the total time delay of the delay elements, the OR-gate will supply an output signal. This output signal can be used by a phase-locked loop to sychronize the demodulation of the data signal. If desired, the delay elements can be variable with a delay controlled by an output signal from the phase-locked loop, and thereby track a varying center frequency of the data signal.

DESCRIPTION OF THE DRAWINGS

FIG. 7 shows some waveforms that will occur for enhanced non-return to zero modulation.

DETAILED DESCRIPTION

Figure 1:
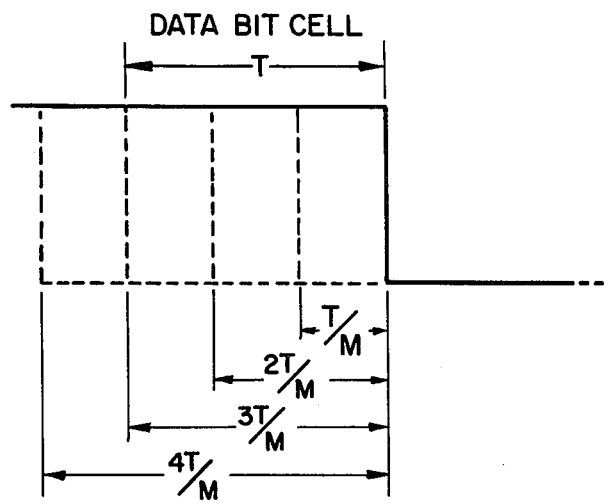
FIG. 1 shows a data bit cell having various internal boundaries at which a transition can occur.
Figure 2:
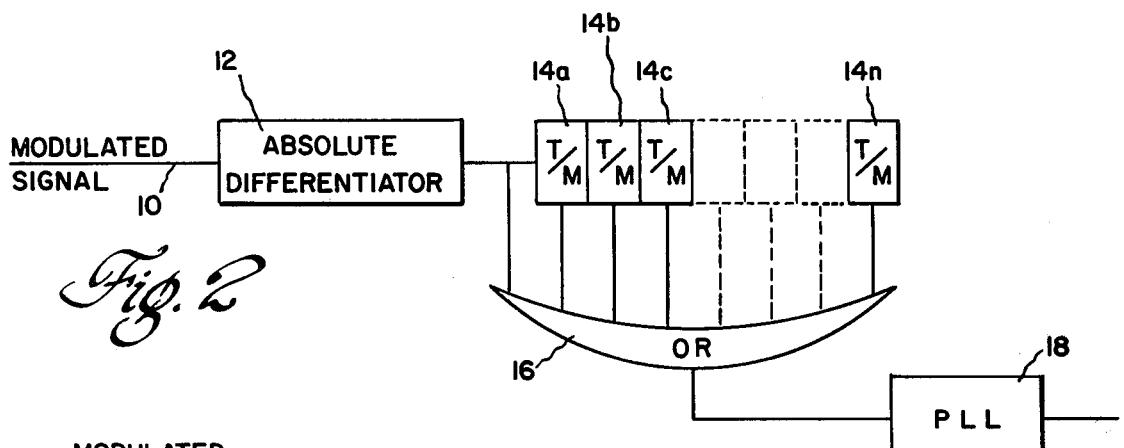
FIG. 2 shows a basic auto-correlation demodulator.

FIG. 1 shows a data cell bit and various internal boundaries. The data cell bit has an overall length of T for the class of self-clocking modulation schemes here considered. The allowable edge transitions may be displaced from the bit cell boundaries by T/M, wherein M is an integer, or multiples of T/M. In other words, a transition between one level and another can take place within one data bit cell. For the modulation to be self-clocking, the maximum time between two consecutive transitions must be KT/M, where K is some finite integer. That is to say, a transition must occur within some selected time, in order to be able to extract the synchronization information. FIG. 2 shows a scheme for extracting this information. The modulated signal comes in on a lead 10 to an absolute differentiator 12. The absolute differentiator 12 can comprise a zero crossing detector followed by a short one-shot (monostable multi-vibrator). Thus, the output of the absolute differentiator is a short pulse whenever there is a transition in the input data modulation signal on lead 10. This pulse is always in the same direction hence the name "absolute differentiator". The short pulse is then applied to a series of serially coupled fixed delay elements 14a, 14b. .. 14n, where n is the total number of delay elements. In general, n should be greater than or equal to $K-1$. The delay of each of the delay elements 14 in general is equal to T/M. The outputs from all of the delay elements 14 as well as that from absolute differentiator 12 are then applied to an OR-gate 16, which supplies an output signal with a clock-signal having a frequency M/T. Each edge of the clock signal coming from OR-gate 16 is the sum of n possible transitions of the original waveform. Therefore, losses of the original signal for less than NT/M will not effect the clock. This correlation time NT/M is analogous to the inertia of a phase-locked loop which conventionally is used for clock recovery. If n is chosen equal to $K-1$, the clock will probably have little or no correlation from multiple edge transitions. In such a case, the clock could be used as the input to conventional phase-locked loop 18 to derive a clock signal which does have inertia (correlation). This phase-locked loop 18 can then be used in turn to demodulate the data signal. The general advantage of a scheme such as shown in FIG. 2 is to reduce the root mean square of the tracking error of the phase lock loop 18 by increasing the effective number of edge transitions per bit cell.

Figure 3:
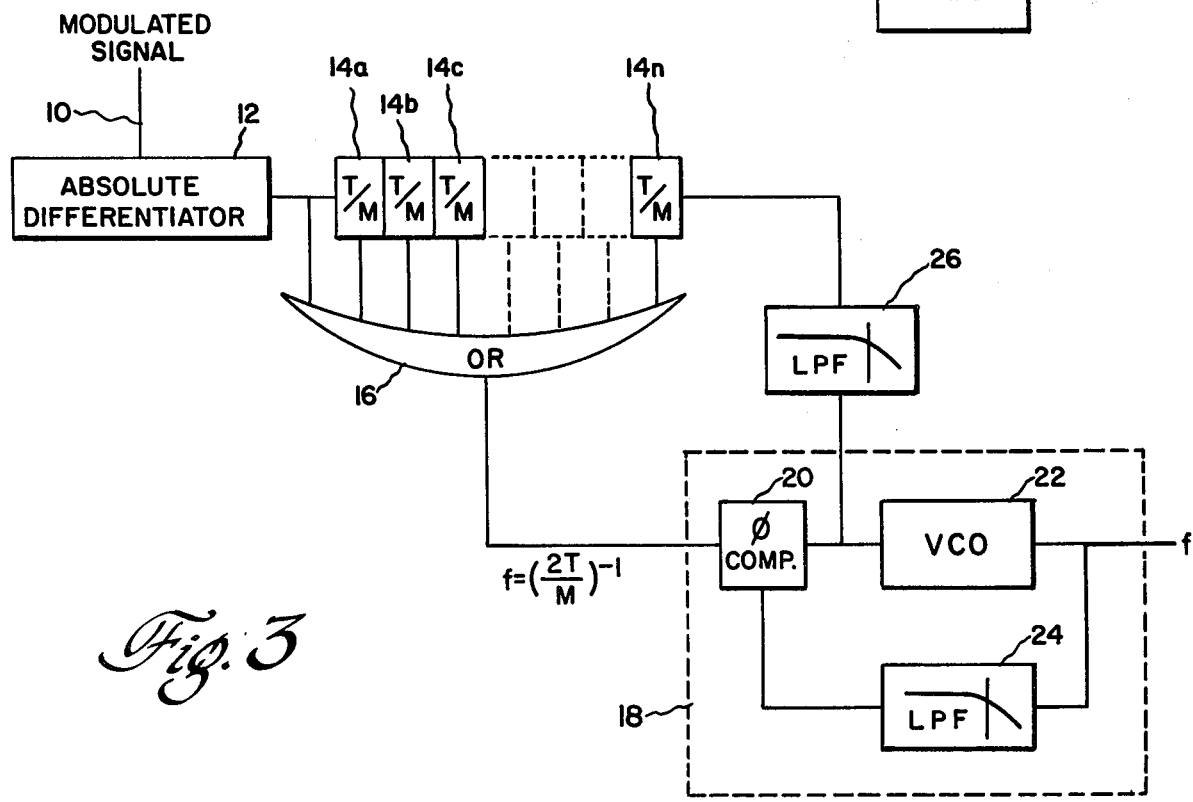
FIG. 3 shows another demodulator for tracking a variable data signal center frequency.

FIG. 3 shows a circuit for using the invention in the event a modulated signal has a widely varying center frequency. In this case, the delay elements 14 have a variable time delay and can be automatically adjusted to follow any longterm change in the center frequency of the modulated signal. Programmable one-shots (monostable multivibrators) are one type of controllable delay element that can be used. As shown in FIG. 3, the phase-locked loop 18 comprises a phase comparator 20, that supplies an error signal to a voltage controlled oscillator 22, and a low-pass filter 24 to supply a signal to the phase comparator 20. Another low-pass filter 26 is coupled to the phase comparator 20 output and supplies a control signal to each of the variable delay elements 14, so that the time delay varies in accordance with the error signal at the output of phase comparator 20. Thus, the time delay of the delay elements 14 will track the varying center frequency of the data signal.

Figure 4:
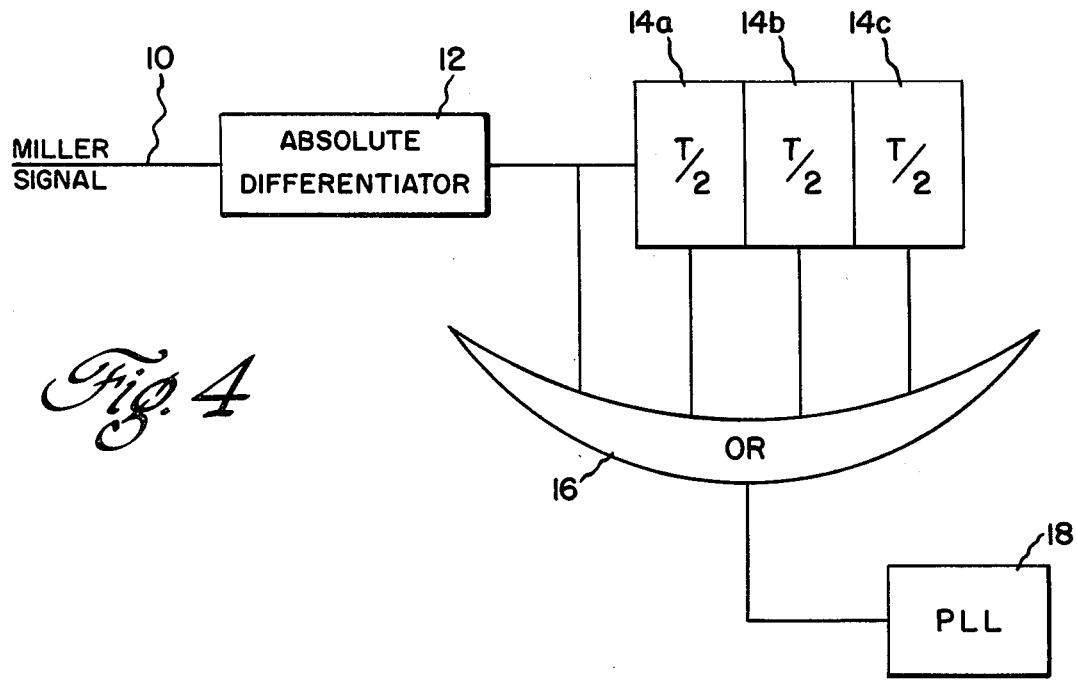
FIG. 4 shows an auto-correlation circuit for a type of Miller demodulation.
Figure 5:
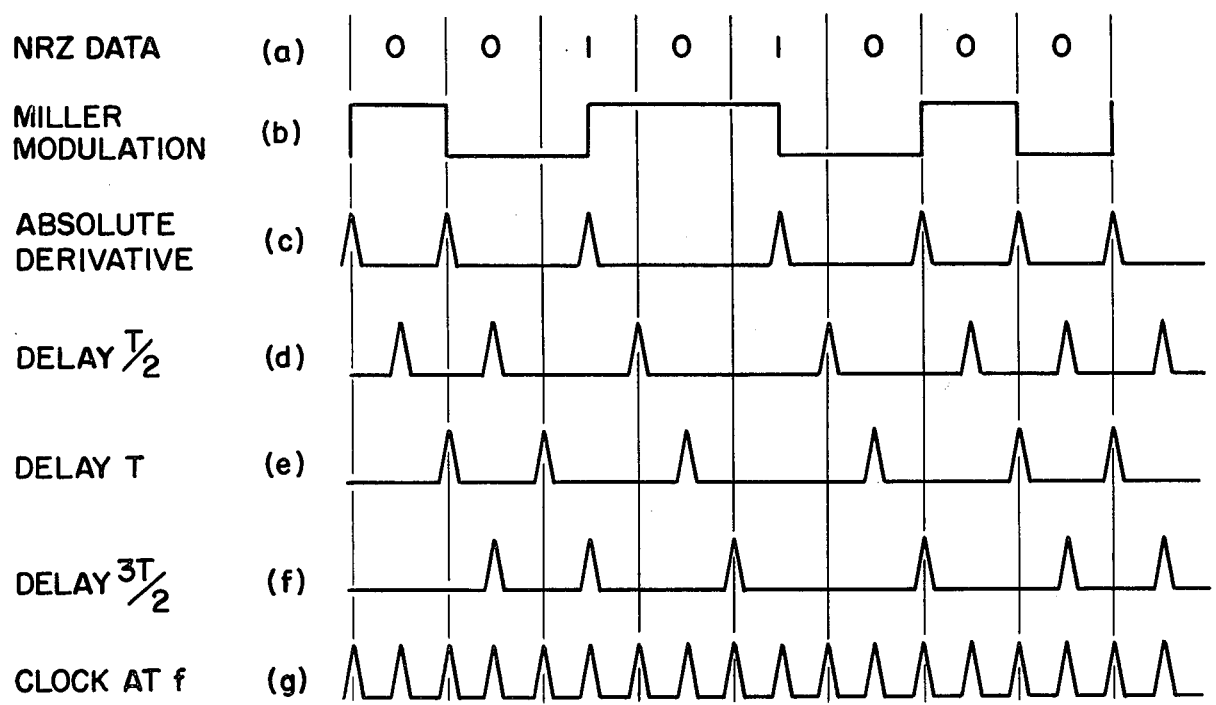
FIG. 5 shows some waveforms that occur during Miller demodulation.

FIG. 4 shows a circuit for a special case of Miller modulation where the waveforms are shown in FIG. 5. FIG. 5a shows the original non-return to zero data signal. In Miller modulation, when the data is a "one" a transition is made in the middle of the one, when there is a single "zero" no transition occurs, but when there is a double "zero" a transition is made at the edge of the data between the double zeros. Thus, the result of Miller modulation is shown in FIG. 5b, and this is the signal that is present on line 10 of FIG. 4. The absolute differentiator 12 supplies the absolute derivative as shown in FIG. 5c. In this example, M=2, K=4 so the maximum time between transitions is $KT/M=2T$ and therefore N is greater than or equal to 3. For the example given, N=3 and the delays are fixed. FIGS. 5d, e, and f show the outputs of the three delay elements 14a, 14b, and 14c which supply signals delayed by T/2, T and (3/2)T. The clock coming out from OR-gate 16 is shown in FIG. 5g, and it is clearly seen here how it is rich in transitions as compared with the Miller modulation shown in FIG. 5b. Because in this example, N=3 there is little or no inertia for this clock at F=1/T, and therefore the conventional phase lock loop 18 is used to derive a clock signal with long term stability.

Figure 6:
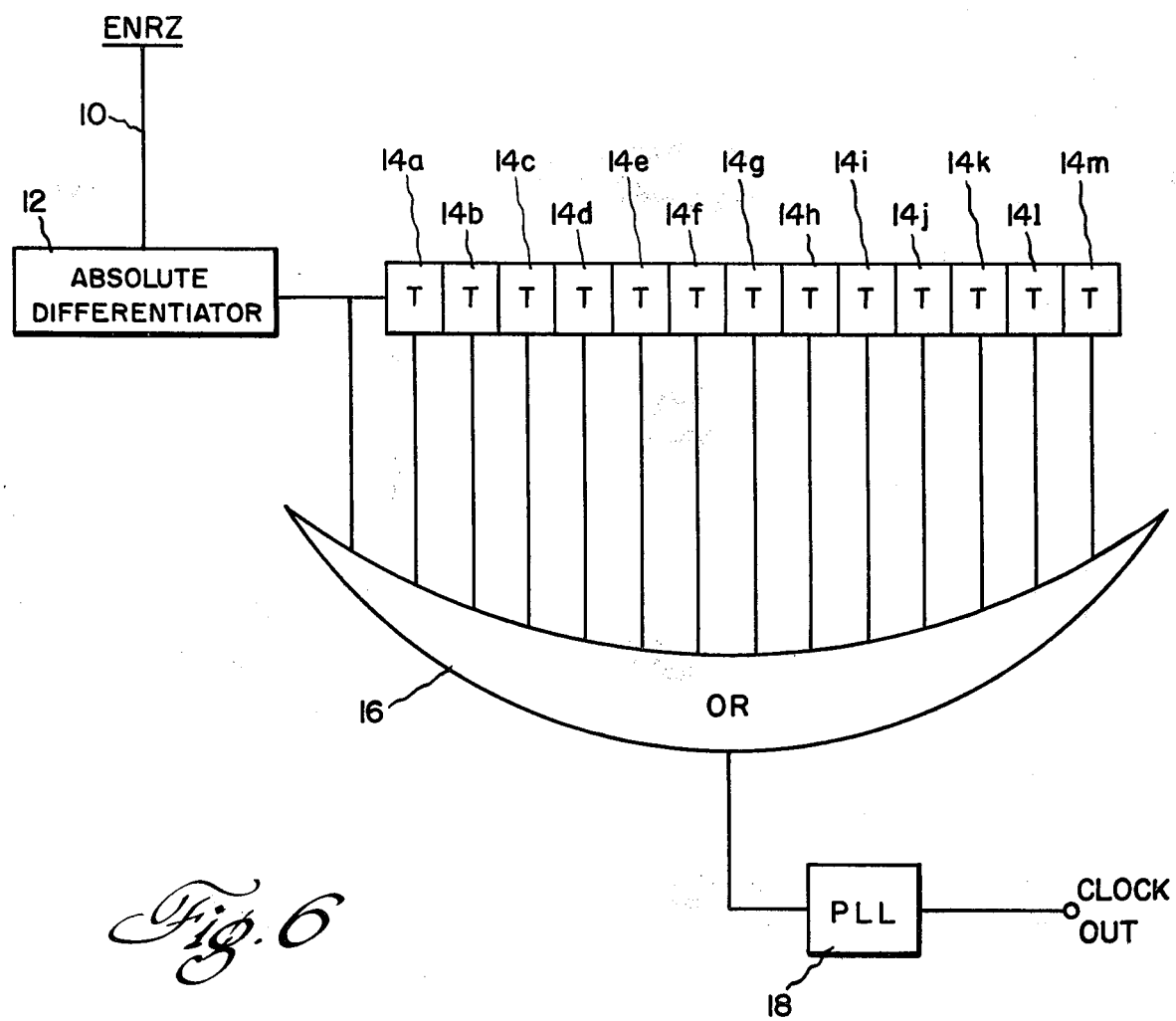
FIG. 6 shows an auto-correlation circuit for a type of commonly occuring enhanced non-return to zero modulation.

FIG. 6 shows a circuit for a typical enhanced non-return to zero modulation and FIG. 7 some waveforms that occur therein. In this case, it is assumed that there are 7 data bits and which are turned into 8 modulation bits by adding one parity bit. Hence, the worst possible clock recovery case is data bits (1000000) (0000000) mapped into modulation bits (10000000) (00000001). For this case, there are 14 consecutive zeros which makes clock recovery very difficult. FIG. 6 shows a circuit for recovering the clock in such a situation. In this example, M=1, K=14 and therefore N must be greater than or equal to 13. For the example given, N=13 and the delays are fixed. FIG. 7a shows the worst possible case of an enhanced non-return to zero waveform. FIG. 7b shows the absolute derivative of FIG. 7a and FIGS. 7c through g the absolute derivative as delayed through various time delays. FIG. 7h shows the signal clock coming out of OR-gate 16 which has many transitions.

It will be appreciated that in certain applications, data errors occur as bursts of missing data. In the example shown in FIG. 6, all error bursts of missing data less than or equal to 14 bits in length have nominally no effect on clock recovery.

It will be appreciated that many other embodiments are possible without parting from the spirit in scope of the invention.

We claim:

1. A method of recovering a clock signal from a self-clocking digital signal comprising absolute differentiating said digital signal; time delaying said differentiated signal through a plurality of serially coupled delay elements, and providing an output clock signal upon an output from the combined outputs of each of said delay elements and said absolute differentiated signal.

2. A method as claimed in claim 1, further comprising synchronizing a phase-locked loop by the use of said output clock signal.

3. A method as claimed in claim 2, further comprising changing the delay of said delay elements in accordance with a signal from said phase-locked loop.

4. A circuit for providing a clock signal from a self-clocking digital signal, said circuit comprising an absolute differentiator having an input means for receiving said digital signal and an output, a plurality of serially coupled delay elements, a first one of said delay elements being coupled to said absolute differentiator output, and an OR-gate coupled collectively to an output of each of said delay elements and to said absolute differentiator output, said OR-gate having an output means for providing the clock signal.

5. A circuit as claimed in claim 4, further comprising a phase-locked loop coupled to said OR-gate output means.

6. A circuit as claimed in claim 5, wherein said delay elements include input means for varying the amount of delay, and wherein said circuit further comprises means for applying a signal from said phase-locked loop to said input means for controlling the delay of said delay elements.

7. A circuit as claimed in claim 6, wherein said applying means comprises a low-pass filter.

* * * * *